United States Patent Office 3,555,025
Patented Jan. 12, 1971

---

3,555,025
2 - METHYL - 3 - AMIDINO - QUINOXALINE-1,4-DI-N-OXIDES AND THEIR PRODUCTION
Kurt Ley, Odenthal-Globusch, Ulrich Eholzer, Cologne-Stammheim, Karl-Georg Metzger, Wuppertal-Elberfeld, and Dieter Fritsche, Wuppertal-Vohwinkel, Germany, assignors to Farbenfabriken Bayer Aktiengesellschaft, Leverkusen, Germany, a corporation of Germany
No Drawing. Filed Oct. 2, 1968, Ser. No. 764,612
Claims priority, application Germany, Oct. 4, 1967, F 53,668
Int. Cl. C07d 51/76
U.S. Cl. 260—250                       16 Claims

ABSTRACT OF THE DISCLOSURE 2-methyl-3-amidino-quinoxaline-1,4-di-N-oxides of the formula:

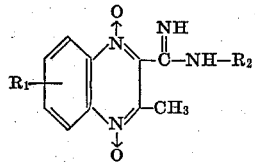

(I)

wherein:

$R_1$ is hydrogen, lower alkyl, lower alkoxy or chlorine, and $R_2$ is hydroxy or amino, are useful as antibacterial compounds. These compounds may be produced, inter alia, by reacting a 2-methyl-3-cyano-quinoxaline-1,4-di-N-oxide of the formula:

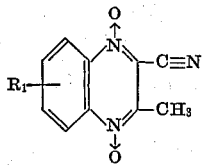

(II)

with a compound of the formula:

$R_2$—$NH_2$  (III)

wherein $R_1$ and $R_2$ are as above defined.

---

The present invention is concerned with 2-methyl-3-amidino-quinoxaline-1,4-di-N-oxides and their production. More particularly, these compounds can be represented by the formula:

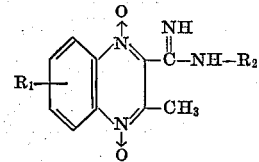

(I)

wherein:

$R_1$ is hydrogen, lower alkyl, lower alkoxy or chlorine, and $R_2$ is hydroxy or amino.

These compounds are useful as antibacterial compounds.

The compounds of the present invention may be produced, inter alia, by reacting a 2-methyl-3-cyano-quinoxaline-1,4-di-N-oxide of the formula:

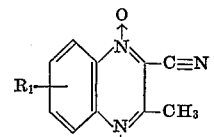

(II)

with a compound of the formula:

$R_2$—$NH_2$  (III)

in a suitable organic solvent at a temperature of from about 10° C. to about 80° C., preferably from about 20° C. to about 35° C.

According to the present invention, the preferred lower alkyl and lower alkoxy groups for $R_1$ are those containing 1 to 4 carbon atoms.

If 2-methyl-3-cyano-quinoxaline-1,4-di-N-oxide and hydroxyl-amine or 2-methyl-3-cyano-7-chloro-quinoxaline-1,4-di-N-oxide and hydrazine are used as starting materials, the reaction of the invention can be represented by the following reaction mechanisms:

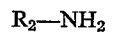

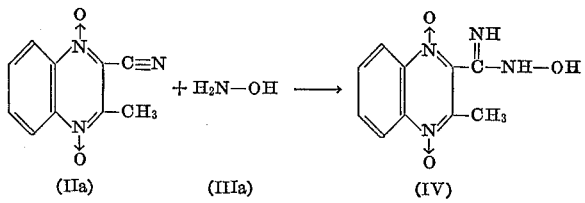

(IIa)         (IIIa)         (IV)

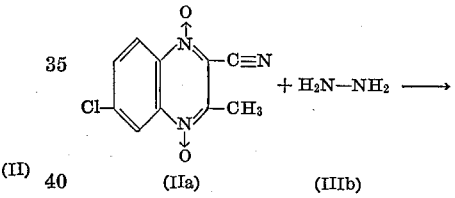

(IIa)         (IIIb)

(V)

The 2-methyl-3-cyano-quinoxaline-1,4-di-N-oxides used as starting compounds for the process according to the invention may be obtained by reaction of benzofuroxan with 5-methyl-isoxazole.

Suitable starting compounds for the reaction according to the invention are:

2-methyl-3-cyano-quinoxaline-1,4-di-N-oxide,
2,7-dimethyl-3-cyano-quinoxaline-1,4-di-N-oxide,
2-methyl-3-cyano-7-chloro-quinoxaline-1,4-di-N-oxide,
2 - methyl-3-cyano-7-methoxy-quinoxaline-1,4-di-N-oxide.

The process according to the invention is expediently carried out as follows:

One mole of the 2-methyl-3-cyano-quinoxaline-1,4-di-N-oxide is suspended in an organic solvent; there are then added, at room temperature, 1–3 moles, preferably 1.5–2 moles, of hydrazine (as hydrate) or hydroxylamine (if desired, in the form of a salt of a mineral acid with the addition of an acid-binding agent, for example, triethylamine). By stirring for several hours at 10° C.–80° C., preferably at 20° C.–35° C., the appropriate 2-methyl-3-amidino-quinoxaline-1,4-di-N-oxides are obtained as crystalline compounds.

As solvents, alcohols (preferably isopropanol), dimethyl formamide, acetonitrile, dioxan and tetrahydrofuran are preferably used.

Hydroxylamine is expediently added in the form of a salt with a mineral acid, e.g. as hydrochloride and liberated by addition of one mole of an acid-binding agent, for example triethylamine.

Hydrazine may also expediently be used in the form of its hydrate. Aqueous hydrazine solutions with a water content of up to about 90% can also be used.

The antibacterial activity of the compounds of the present invention has been demonstrated both in vitro and in vivo and the compounds of the present invention have, in such tests, shown utility upon both subcutaneous as well as oral administration against acute bacterial infections. The compounds are effective against a range of both gram positive and gram negative bacteria.

The general dosage ranges of the compounds of the present invention are from about 5 mg. to about 150 mg. and preferably from about 25 mg. to about 150 mg./kg. per body weight per day. It is, however, to be appreciated that in some cases it may be necessary or desirable to administer a greater or lesser amount, which amount will be dependent upon the type of infection, the severity of the condition, the body weight of the human or animal involved, the past medical history and other factors generally taken into consideration by those administering antibacterial compounds. In the case where larger amounts are administered, it is generally advisable to divide these larger dosages into several smaller doses which may be administered during the course of the day.

The compounds of the present invention may be used either as such or may be administered in combination with known pharmaceutically acceptable carriers and diluents. Suitable as administration forms in combination with various inert carriers and diluents for the compounds of the present invention are tablets, capsules, powders, sprays, elixirs, aqueous suspensions, injectable solutions, syrups and the like. The carriers and diluents also include fillers and sterile aqueous media, as well as non-toxic organic solvents and other suitable pharmaceutical vehicles well known by those in the art. If desired, tablets, capsules or other forms used for oral administration may be provided with a sweetening additive or other suitable flavoring substance. The compounds of the present invention, which is the active ingredient in such a pharmaceutical composition, should be present in a concentration of from about 0.5 to about 90% by weight of the total composition.

For oral administration, tablets may also contain such known additives as sodium citrate, calcium carbonate, dicalcium phosphate, together with various adjuvants such as starch, preferably potato starch, and the like, and binders such as polyvinylpyrrolidine, gelatin and the like, lubricants such as magnesium stearate, sodium lauryl sulphate and talc may also be used for tablet-making. For aqueous suspensions and/or elixirs which are intended for oral administration, suitable substances to improve the taste, dyestuffs, emulsifiers and/or diluents, such as water, ethanol, propylene glycol, glycerol and the like, may be added.

For solutions intended for parenteral application, the compound of the present invention may be combined with sesame oil or arachis oil or aqueous propylene glycol or N,N-dimethyl formamide may be used, as well as sterile aqueous solutions when water soluble compounds are utilized. If necessary, such aqueous solutions can be buffered in known and customary manner and the liquid diluents should be rendered isotonic beforehand by the addition of the requisite amount of salt or glucose. Such aqueous solutions are particularly suitable for intravenous, intramuscular and intraperitoneal injections. Sterile aqueous media may be prepared in manners per se known in the art.

The following data shows the effectiveness of compounds selected as representative of the class as a whole and the number of the compounds tested corresponds to the example number. These tests demonstrate the effectiveness of representative species and the genus as a whole embraces compounds having antibacterial activity already indicated.

In the animal experiments with white mice, the intraperitoneally infected animals were treated subcutaneously or orally as follows:

(1) Administration in one dose, subcutaneously or orally, of 1000 mg., 500 mg., 200 mg., 100 mg., 50 mg., 25 mg., 12.5 mg. or 6.25 mg./kg. 15 minutes before or 90 minutes after infection.

(2) Administration in two (or three) doses of 6.25 mg., 12.5 mg., 25 mg., 50 mg. or 150 mg./kg. two hours before and five hours after infection.

(3) Administration in four doses of 50 mg. or 150 mg./kg. two hours before infection, shortly before infection, 3 hours, 5 hours and/or 21 hours and 29 hours after infection.

The bacteria used for infections were *E. coli*, Klebsiella, *Staphylococcus aureus*, *Diplococcus pneumoniae* or *Streptococcus pyogenes*, *Proteus mirabilic* and *Pseudomonas aeruginosa*. The $ED_{100}$ of the most effective compounds (e.g., 1, 2, 4) against *E. coli* C165 lies, in the case of administration in one dose, orally or subcutaneously, between 5 mg./kg. and 100 mg./kg.

The $DL_{50}$ lies in the dosage range of about 400 mg./kg. to about 2500 mg./kg. after oral administration in one dose to mice. The substances are thus relatively non-toxic since the relatively less well tolerated ones are distinguished by higher effectiveness and are, therefore, applied only in low dosage. Also in the case of treatment of rats with 60 mg./kg. orally twice daily over two weeks, the substances were well tolerated. In the case of acute ascending infections of the urinary tract of the rat (pyclonephritis), dosages of 2× 15 mg./kg. daily, i.e., 15 mg./kg. twice a day, over 7–10 days were applied with success and were tolerated well. In vitro, the substances act bacteriostatically and bactericidally.

The new compounds are also effective against mycoplasma infections in the in vitro test, amounts of about 5 to about 50γ per ml. being used.

(1).—ANIMAL EXPERIMENTS WITH WHITE MICE

| Compound (Example No.) | Infection germ | Doses, mg./kg. (oral or subcutaneous) | Percent surviving animals 24 hours after infection |
|---|---|---|---|
| 1 | E. coli | 1×25 | 100 |
|   | Staph. aureus | 1×100 | 100 |
| 2 | E. coli | 1×100 | 100 |
|   | Staph. aureus | 2×100 | 100 |
| 4 | E. coli | 1×100 | 100 |
|   | Staph. aureus | 1×100 | 100 |
| 5 | E. coli | 1×100 | 100 |
|   | Klebsiella | 1×100 | 100 |

(2).—INHIBITION VALUES IN VITRO

| Bacterium | Minimum inhibition conc., in μg./ml. (nutrient medium) | | | |
|---|---|---|---|---|
|  | 1 | 2 | 4 | 5 |
| E. coli | 10–100 | 10–100 | 10–100 | 50–100 |
| Proteus sp | 10 | 100 | 50 | 50–100 |
| Pseudomonas aeruginosa | 50–100 | 100 | 100 | 150 |
| Klebsiella sp | 10–100 | 10–100 | 10–50 | 100 |
| Staph. aureus | 100 | 150 | 150 | 150 |
| Streptococcus pyogenes | 100 | 100 | 150 | 150 |

The preparation of the compounds of the present invention is illustrated by the following examples.

EXAMPLE 1

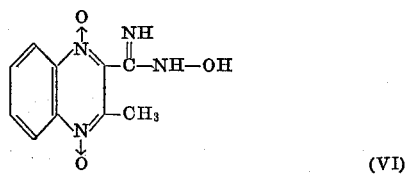

(VI)

40 g. (0.2 mole) 2-methyl-3-cyano-quinoxaline-1,4-di-N-oxide are suspended in 200 ml. dimethyl formamide, 28 g. (0.4 mol) hydroxylammonium hydrochloride are added, and 40.4 g. (0.4 mole) triethylamine are added dropwise at 20° C.–25° C., with slight cooling. Stirring is continued for 4 hours at 25° C., the yellow crystals are filtered off with suction, washing with cold water in order to remove the triethylamine hydrochloride is effected, followed by recrystallisation from hot water. 30 g. (=65% of the theory) of 2-methyl-3-N-hydroxyamidino-quinoxaline-1,4-di-N-oxide are obtained as yellow crystals which melt at 212° C., with decomposition.

Analysis.—$C_{10}H_{10}N_4O_3$ (molecular weight 234) Calc. (percent): C, 51.3; H, 4.71; N, 23.95. Found (percent): C, 51.0; H, 4.6; N, 23.7.

EXAMPLE 2

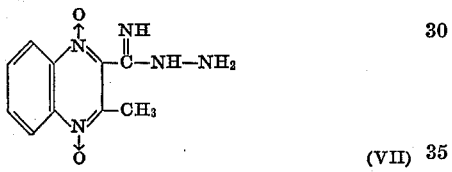

(VII)

100.5 g. (0.5 mole) 2-methyl-3-cyano-quinoxaline-1,4-di-N-oxide are suspended in 500 ml. dimethyl formamide and 100 g. (2 moles) hydrazine hydrate are added dropwise at 20° C.–25° C. Stirring is continued for 4 hours at 25° C., followed by cooling and the yellow crystals are filtered off with suction. After recrystallization from dimethyl formamide, 43 g. (37% of the theory) of 2-methyl-3-hydrazidino-quinoxaline-1,4-di - N - oxide are obtained as pale brown needles which melt at 191° C., with decomposition.

Analysis.—$C_{10}H_{11}N_5O_2$ (molecular weight 233) Calc. (percent): C, 51.5; H, 4.72; N, 30.10. Found (percent): C, 51.8; H, 4.8; N, 29.9.

The 2-methyl-3-cyano-quinoxaline - di - N - oxide (1.4) used as starting compound was obtained as follows:

492 g. (3.62 moles) of benzofuroxan are suspended in 1000 ml. methanol. 204 g. (3.8 moles) ammonium chloride are added, and 2 to 3 moles of ammonia are introduced at 20 to 30° C. into this suspension is added dropwise, with stirring and further slow introduction of ammonia without supply of heat, a solution of 393 g. of an isometric mixture of 70% by weight of 5-methylisoxazole and 30% of 4-methylisoxazole (corresponding to 3.31 moles of 5-methylisoxazole) in 250 ml. methanol, which solution had previously been heated to 50 to 55° C. for 30 minutes with a solution of 186 g. (3.31 moles) of potassium hydroxide in 1.5 l. of methanol.

When the benzofuroxan is added, the mixture heats up to 45° C. After subsidence of the heat effect, heating to 40° C. to 45° C. is effected for a further 4 hours. During the reaction, the benzofuroxan dissolves, the reaction product separates in yellow crystals. Suction filtration is effected, followed by washing with water and methanol, and drying. 572 g.=86% of the theory (with a referfence to 5-methylisoxazole) of 2-methyl-3-cyano-quinoxaline-1,4-di-N-oxide are obtained as yellow crystals which, after recrystallization from acetonitrile, melt at 194° C., with decomposition.

TABLE

| Ex. No. | Formula | M.P. in °C., decomp. | Appearance |
|---|---|---|---|
| 3 | (VIII) | 206 | Yellow crystals. |
| 4 | (IX) | 215 | Do. |
| 5 | (X) | 256 | Do. |
| 6 | (XI) | 215 | Pale-brown crystals. |

The other compounds, that is, those whose formulas are set fourth as Examples 3 through 6 are prepared in a similar manner by reacting, respectively:

2-methyl - 3 - cyano-7-chloro-quinoxaline-1,4-di-N-oxide with hydroxylammonium hydrochloride;

2-methyl - 3 - cyano-7-methyl-quinoxaline-1,4-di-N-oxide with hydroxylammonium hydrochloride;

2-methyl - 3 - cyano-7-methoxy-quinoxaline-1,4-di-N-oxide with hydroxylammonium hydrochloride;

2-methyl - 3 - cyano-7-chloro-quinoxaline-1,4-di-N-oxide with hydrazine hydrate.

The starting materials set forth above may be obtained in a manner similar to that described with reference to the compounds of Examples 1 and 2.

In addition to the new compounds and processes disclosed herein, the present invention also includes pharmaceutical compositions containing at least one compound of the present invention in combination or admixture with a solid or liquid diluent or carrier, as well as methods of treating bacterial infections. The present invention also includes unit dosage forms comprising at least one compound of the present invention either alone or in admixture or combination with a solid or liquid diluent or carrier. The compound may be suitably enveloped by a protective covering containing the compound itself and, if used, a diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:
1. A compound of the formula:

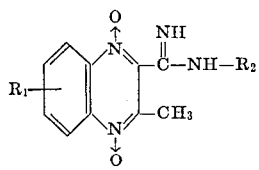

wherein:

R₁ is hydrogen, lower alkyl, lower alkoxy or chlorine, and
R² is hydroxy or amino.

2. A compound according to claim 1 wherein R₁ is hydrogen.
3. A compound according to claim 1 wherein R₁ is lower alkyl.
4. A compound according to claim 1 wherein R₁ is lower alkyl.
5. A compound according to claim 1 wherein R₁ is chlorine.
6. The compound of the formula:

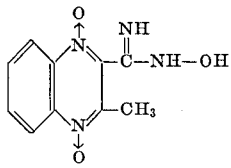

7. The compound of the formula:

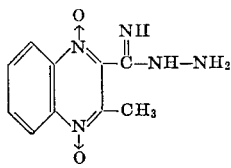

8. The compound of the formula:

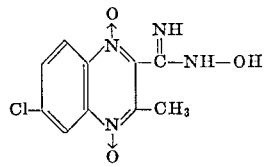

9. The compound of the formula:

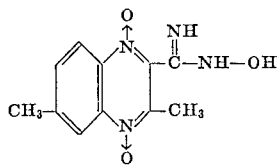

10. The compound of the formula:

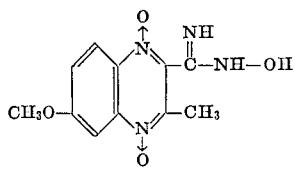

11. The compound of the formula:

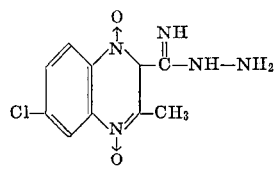

12. A process for the production of a compound of claim 1 which comprises reacting one mole of a 2-methyl-3-cyano-quinoxaline-1,4-di-N-oxide of the formula:

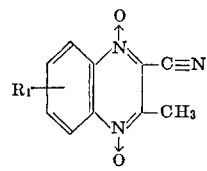

wherein:

R₁ is hydrogen, lower alkoxy or chlorine, with from 1 to 3 moles of a compound of the formula:

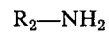

wherein:

R₂ is hydroxy or amino, in a suitable organic solvent selected from the group which includes alcohols, dimethylformamide, acetonitrile, dioxan and tetrahydrofuran at a temperature of from about 10° C. to about 80° C. for several hours and recovering the compound produced.

13. A process according to claim 12 wherein the reaction temperature is from about 20° C. to about 35° C.
14. A process according to claim 12 wherein one molar equivalent of the 2-methyl-3-cyano-quinoxaline-1,4-di-N-oxide is suspended in the organic solvent, there are added thereto 1–3 molar equivalents of hydrazine or hydroxylamine, and the resulting mixture is stirred for several hours at the reaction temperature to complete the reaction.
15. A process according to claim 14 wherein the hydroxylamine is added in the form of a salt of a mineral acid with the addition of an acid-binding agent.
16. A process for the production of 2-methyl-3-cyano-quinoxaline-1,4-di-N-oxides which comprises reacting about 3.8 moles of a benzofuroxan and about 3.3 moles of 5-methyl-isoxazole at a temperature from about 40° C. to about 45° C. for about 4 hours and recovering the compound produced.

References Cited

UNITED STATES PATENTS 3,157,654  11/1964  Sasse et al. _____ 260—250

NICHOLAS S. RIZZO, Primary Examiner

U.S. Cl. X.R.

424—250

PC-1050
(5/69)

UNITED STATES PATENT OFFICE
CERTIFICATE OF CORRECTION

Patent No. 3,555,025                    Dated January 12, 1971

Inventor(s) Kurt Ley et al.

It is certified that error appears in the above-identified patent and that said Letters Patent are hereby corrected as shown below:

Kindly correct as follows:

Claim 4, line 2, change "alkyl" to --alkoxy--.

Signed and sealed this 27th day of April 1971.

(SEAL)
Attest:

EDWARD M. FLETCHER, JR.
Attesting Officer

WILLIAM E. SCHUYLER, J
Commissioner of Patent